US012580770B2

(12) United States Patent
Behera et al.

(10) Patent No.: US 12,580,770 B2
(45) Date of Patent: Mar. 17, 2026

(54) SYSTEM AND METHOD FOR DETECTING HIDDEN EXECUTABLE MEDIA FILES USING ARTIFICIAL INTELLIGENCE AND HASHING ALGORITHMS

(71) Applicant: Bank of America Corporation, Charlotte, NC (US)

(72) Inventors: Abhijit Behera, Hyderabad (IN); Maneesh Kumar Sethia, Hyderabad (IN); Joshita Aratikatla, Hyderabad (IN); Catherine Xavier, Hyderabad (IN); Hemalatha Elluru, Ananthapuramu (IN)

(73) Assignee: Bank of America Corporation, Charlotte, NC (US)

( * ) Notice: Subject to any disclaimer, the term of this patent is extended or adjusted under 35 U.S.C. 154(b) by 29 days.

(21) Appl. No.: 18/816,457

(22) Filed: Aug. 27, 2024

(65) Prior Publication Data

US 2026/0067092 A1 Mar. 5, 2026

(51) Int. Cl.
| | |
|---|---|
| *G06F 21/00* | (2013.01) |
| *G06V 10/44* | (2022.01) |
| *G06V 10/74* | (2022.01) |
| *G06V 10/764* | (2022.01) |
| *H04L 9/32* | (2006.01) |

(52) U.S. Cl.
CPC ............ *H04L 9/3236* (2013.01); *G06V 10/44* (2022.01); *G06V 10/761* (2022.01); *G06V 10/764* (2022.01)

(58) Field of Classification Search
CPC .... H04L 9/3236; G06V 10/44; G06V 10/761; G06V 10/764
See application file for complete search history.

(56) References Cited

U.S. PATENT DOCUMENTS

| | | | |
|---|---|---|---|
| 7,568,233 B1 | 7/2009 | Szor et al. | |
| 8,387,147 B2 | 2/2013 | Sprowls | |
| 8,689,331 B2 | 4/2014 | Feeney et al. | |
| 9,705,904 B1 | 7/2017 | Davis et al. | |
| 10,530,802 B2 | 1/2020 | Thomas et al. | |
| 10,635,813 B2 | 4/2020 | Saxe et al. | |
| 10,762,200 B1 * | 9/2020 | Salem ..................... | G06F 21/54 |
| 10,788,988 B1 | 9/2020 | Lary et al. | |
| 10,868,818 B1 | 12/2020 | Rathor et al. | |
| 10,979,444 B2 | 4/2021 | McLane et al. | |
| 11,210,392 B2 | 12/2021 | Salem et al. | |
| 11,575,704 B2 | 2/2023 | MacLeod et al. | |
| 11,580,218 B2 | 2/2023 | Salem et al. | |
| 11,711,388 B2 | 7/2023 | McLane et al. | |
| 2008/0016339 A1 * | 1/2008 | Shukla ................... | G06F 21/54 |
| | | | 713/164 |
| 2016/0378970 A1 * | 12/2016 | Campbell ............. | G06F 21/575 |
| | | | 726/17 |

(Continued)

*Primary Examiner* — William A Corum, Jr.

(57) ABSTRACT

A system for detecting hidden executable files accesses a first image, generates a first hash value for the first image based at least in part upon a hashing algorithm, determines a first pattern of the first hash value and multiple patterns of stored hash values corresponding to multiple images without hidden executable files, determines whether the first pattern matches any of the patterns based on a comparison between the first pattern and each of the patterns, and determines the first image includes a hidden executable file if the first pattern does not match any of the patterns.

17 Claims, 3 Drawing Sheets

(56) References Cited

U.S. PATENT DOCUMENTS

| 2019/0273509 | A1 | 9/2019 | Elkind et al. |
| 2022/0300452 | A1 | 9/2022 | Diehl |
| 2023/0222207 | A1 | 7/2023 | Carson |
| 2024/0232346 | A9 | 7/2024 | Saxe et al. |

* cited by examiner

SYSTEM AND METHOD FOR DETECTING HIDDEN EXECUTABLE MEDIA FILES USING ARTIFICIAL INTELLIGENCE AND HASHING ALGORITHMS

TECHNICAL FIELD

The present disclosure relates generally to detection of hidden executable files, and more specifically, to a system and method for detecting hidden executable media files using artificial intelligence and hashing algorithms.

BACKGROUND

In computer science, executable code, an executable file, or an executable program, sometimes simply referred to as an executable or binary, causes a computer to perform indicated tasks according to encoded instructions, as opposed to a data file that must be interpreted (parsed) by an interpreter to be functional. The exact interpretation depends upon the use. Instructions generally refer to machine code instructions for a physical CPU. In some contexts, a file containing scripting instructions (such as bytecode) may also be considered executable.

A hidden executable file can be intentionally designed to cause disruption to a computer, server, client, or computer network, leak private information, gain unauthorized access to information or systems, deprive access to information, or which unknowingly interferes with the user's computer security and privacy. Hidden executable files pose security problems to individuals and entities on the Internet.

SUMMARY

The system disclosed in the present application provides a technical solution to the problems discussed above. The disclosed system can improve detections of hidden executable files by using artificial intelligence (AI) and hashing algorithms to determine whether a file is embedded with hidden executable files. The file can be an image file, an audio file, a video file, a website, a URL, or any suitable type of communication file. Taking an image file as an example, when a user receives an image, a system generates a hash value for the image. The system then compares the pattern of the generated hash value with patterns of stored hash values that correspond to images without hidden executable files. If the pattern of the generated hash value of the image does not match any of the patterns of stored hash values that correspond to images without hidden executable files, it suggests that the image may have a hidden executable file. If the pattern of the generated hash value of the image matches any of the patterns of stored hash values that correspond to images without hidden executable files, the system further performs an AI based image analysis as a secondary security measure, which can determine whether the image includes a hidden executable file. Although this disclosure describes detecting hidden executable files with respect to a particular use case involving images, this disclosure contemplates detecting hidden executable files from any suitable type of file (e.g., image files, audio files, video files, websites, URLs, or any suitable communication file).

In one embodiment, the disclosed system for detecting hidden executable files includes a memory operable to store a plurality of hash values corresponding to a plurality of images without hidden executable files, respectively. The disclosed system also includes a processor operably coupled to the memory. The processor is configured to access a first image. The processor is then configured to generate a first hash value for the first image based at least in part upon a hashing algorithm. The processor is then configured to determine a first pattern associated with the first hash value and a plurality of patterns associated with the plurality of stored hash values, respectively. The processor is then configured to determine whether the first pattern matches any of the plurality of patterns based on a comparison between the first pattern and each of the plurality of patterns. If the first pattern does not match any of the plurality of patterns, the processor is configured to determine the first image comprises a hidden executable file.

In one embodiment, the first pattern matches one of the plurality of patterns. The processor of the disclosed system is configured to extract features from the first image. The processor of the disclosed system is then configured to input the extracted features into an artificial-intelligence algorithm configured to classify between images and executable files. The processor of the disclosed system is further configured to determine, based on the artificial-intelligence algorithm, whether the first image comprises a hidden executable file.

In one embodiment, the first pattern does not match any of the plurality of patterns. The processor of the disclosed system is further configured to disable an interaction with the first image.

In one embodiment, the first pattern does not match any of the plurality of patterns. The processor of the disclosed system is configured to determine the first image is associated with one or more of a particular extension, a particular format, a particular content, or a particular website. The processor is then configured to block access to images associated with one or more of the particular extensions, the particular format, the particular content, or the particular website.

In one embodiment, the processor of the disclosed system is further configured to determine a file path associated with the first image. Accordingly, accessing the first image is via the determined file path.

In one embodiment, the processor of the disclosed system is configured to convert the first image to binary data. The processor is then configured to input the binary data into the hashing algorithm.

In one embodiment, the memory is further operable to store a plurality of additional hash values corresponding to a plurality of executable files, respectively. The processor of the disclosed system is configured to determine, based on a machine-learning model, a plurality of patterns associated with the plurality of additional hash values, respectively. The processor is then configured to determine whether the first pattern matches any of the plurality of patterns associated with the additional hash values based at least in part upon a comparison between the first pattern and each of the plurality of patterns associated with the additional hash values by the machine-learning model. The processor is then configured to determine the first image does not comprise a hidden executable file if the first pattern does not match any of the plurality of patterns associated with the additional hash values. The processor is then configured to determine the first image comprises a hidden executable file if the first pattern matches any of the plurality of patterns associated with the additional hash values.

In one embodiment, determining the first pattern and the plurality of patterns, and determining whether the first pattern matches any of the plurality of patterns are based on a machine-learning model.

In one embodiment, the processor of the disclosed system is further configured to determine the first image does not comprise a hidden executable file if the first pattern matches one of the plurality of patterns.

The disclosed system and methods provide the practical application of differentiating between harmless files (e.g., image files, audio files, video files, websites, URLs, or any suitable communication file) and potential hidden executable files and strengthening defenses against cyber threats. A hidden executable file can cause disruption to systems or networks, causing security problems to the hardware and networking infrastructures. The disclosed system and methods can address such problems by using AI and hashing algorithms for detections of hidden executable files. As described in example embodiments of the present disclosure, a system generates a hash value for an image, compares the pattern of the generated hash value with patterns of stored hash values that correspond to images without hidden executable files, and determines whether the image is embedded with a hidden executable file based on the comparison. As the pattern of the hash value is uniquely tied to the underlying data structure of an image file, detecting a hidden executable file based on the hash value can improve the accuracy. In addition, the system further performs an AI based image analysis determine whether the image includes a hidden executable file, which can provide a secondary security measure. Upon detecting a hidden executable file, the system can execute a plurality of actions. One action can be disabling the interaction with (e.g., click on) the image. Another action can be removing the hidden executable file from the image before access to the image is permitted. Another action can be isolating the image in a quarantine to prevent it from executing or spreading. The quarantined image can be further tested and made secure. Another action can be alerting a user about the detection. Another action can be blocking access to images associated with extensions, formats, content, or websites that are similar to the image embedded with the hidden executable file. Another action can be initiating a full system scan to check for any additional hidden executable file that may have been introduced alongside the detected hidden executable file. Another action may be deleting the image. Another action may be logging the detection of the hidden executable file for future reference. Another action may be updating security rules based on the detected hidden executable file. Another action may be reporting to a centralized database for further analysis to improve the detection capabilities for hidden executable files.

Technical advantages of certain embodiments of this disclosure may include one or more of the following. By comparing patterns of hash values using an efficient hashing algorithm, the disclosed system and methods can quickly and accurately identify hidden executable files. By utilizing the AI based image analysis, the disclosed system and methods can provide dynamic threat detection and response, adapting to new threats in real-time. Furthermore, the disclosed system and methods take proactive measures by blocking access to files with extension, formats, content, or websites that are similar to those of the detected hidden executable file. Thus, the disclosed system and methods generally improve the technology associated with detection of hidden executable files.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
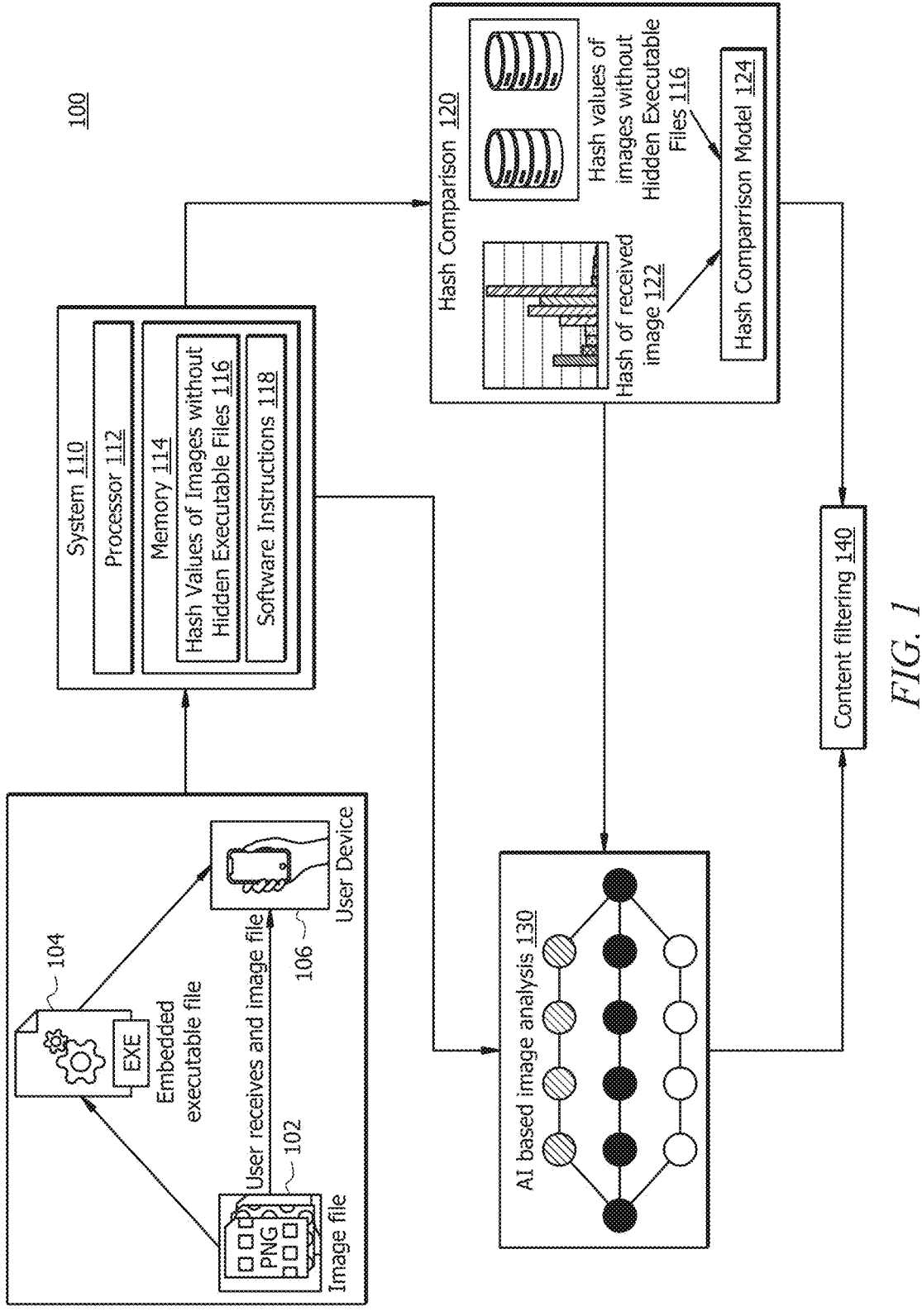
FIG. 1 illustrates an example system configured for detecting hidden executable files.
Figure 2A:
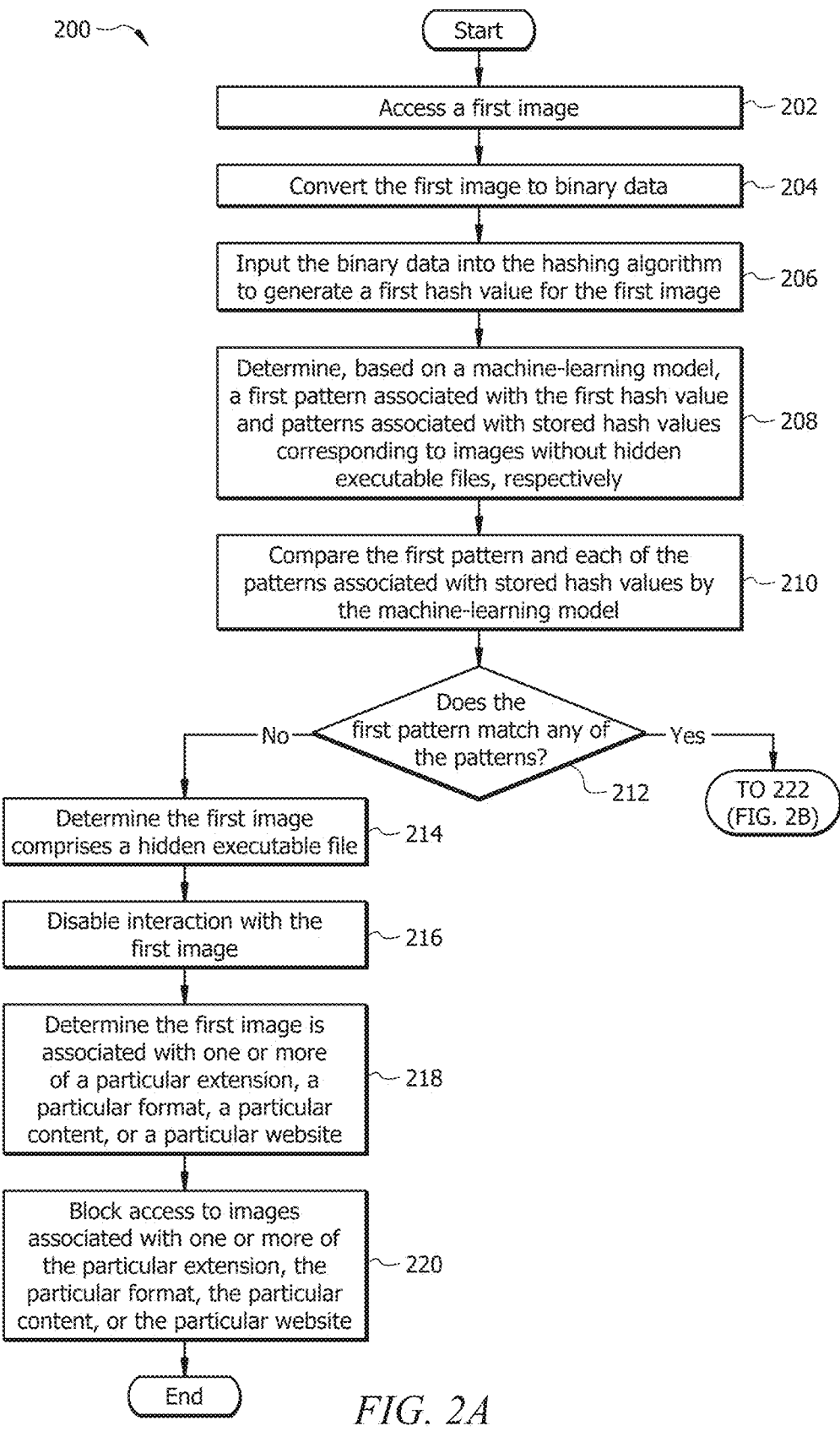
FIGS. 2A-2B illustrate an example flowchart of a method for detecting hidden executable files.
Figure 2B:
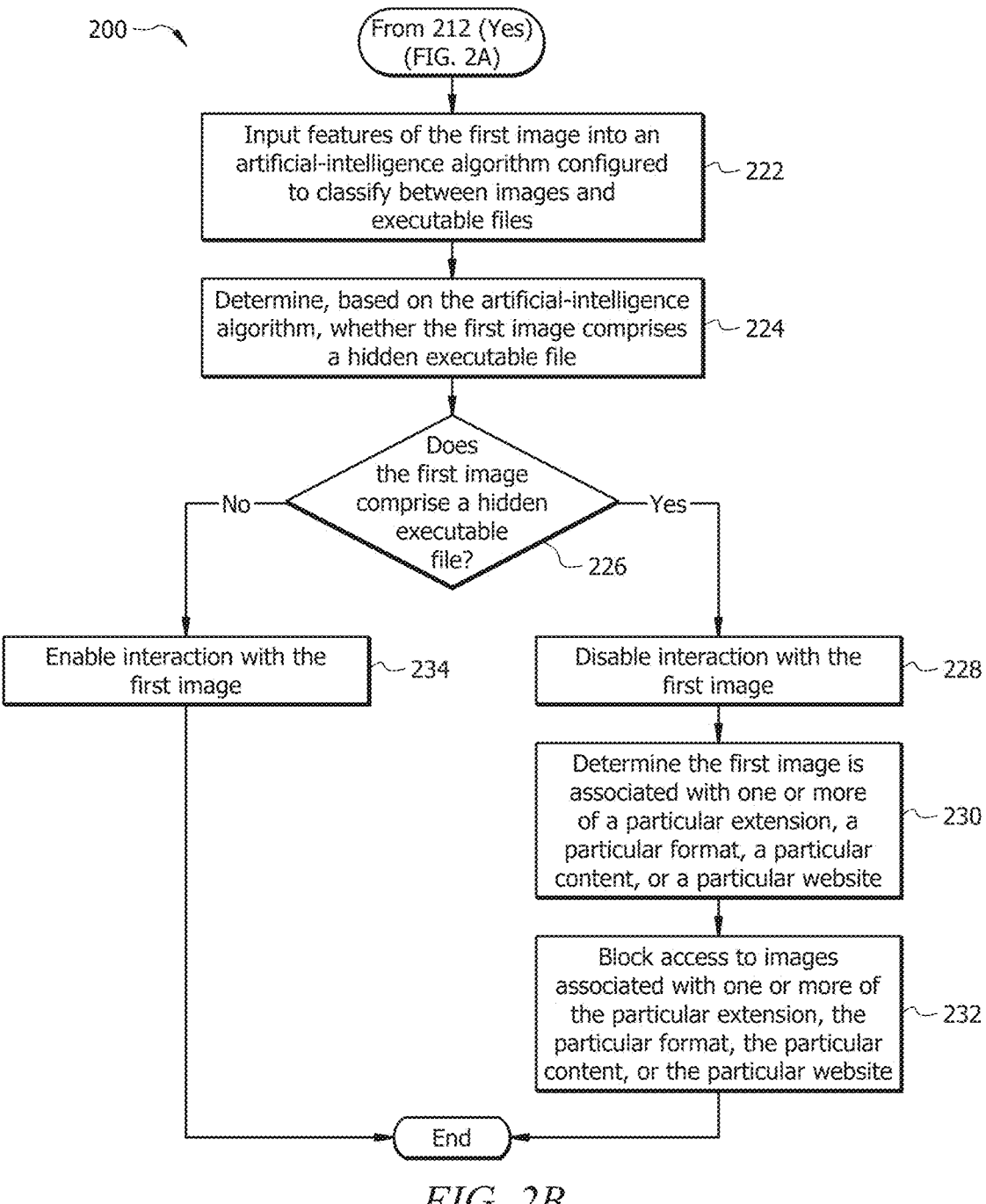

As described above, hidden executable files pose serious problems to individuals and entities on the Internet. This disclosure provides various systems and methods to detect hidden executable files by using artificial intelligence (AI) and hashing algorithms. FIG. 1 illustrates an example system configured for detecting hidden executable files. FIGS. 2A-2B illustrate an example flowchart of a method for detecting hidden executable files.

Example System for Detecting Hidden Executable Files

FIG. 1 illustrates one embodiment of a system 100 that is configured for detecting hidden executable files. System 100 comprises a system 110. In some embodiments, system 100 may not have all of the components listed and/or may have other elements instead of, or in addition to, those listed above.

System Components

System 110

System 110 is generally any device that is configured to process data and communicate with devices (e.g., user device 106), databases, systems, etc. System 110 is generally configured to perform operations described further below in conjunction with method 200 described in FIGS. 2A-2B. In an embodiment, system 110 comprises a processor 112 in signal communication with a memory 114.

Processor 112 comprises one or more processors operably coupled to the memory 114. Processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Processor 112 may be a programmable logic device, a microcontroller, a microprocessor, or any suitable combination of the preceding. Processor 112 is communicatively coupled to and in signal communication with memory 114 and user device 106. Processor 112 is configured to process data. For example, processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches software instructions 118 from memory 114 and executes them by directing the coordinated operations of the ALU, registers and other components. Processor 112 is configured to implement various software instructions 118. For example, processor 112 is configured to execute software instructions 118 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store hash values 116 of images that do not have hidden executable files. Memory 114 also stores the software, and/or any other data or software instructions 118. The software instructions 118 may comprise any suitable set of instructions, logic, rules, or code operable to execute the processor 112. The software instructions 118, when executed by the processor 112, cause the processor 112 to perform one or more functions described herein. For example, when the software instructions 118 are executed, the processor 112 executes the software instructions 118 to determine whether an image file 102 received at a user device 106 comprises a hidden executable file by comparing the hash value of the image file 102 against the hash values 116 stored in the memory 114.

User Device 106

Examples of user device 106 include, but are not limited to, computers, laptops, mobile devices (e.g., smart phones or tablets), servers, clients, or any other suitable type of device. The user device 106 is generally configured to capture data and send instructions for processing the data to the system 110. For example, the data may comprise an image file 102. In other examples, the data may comprise any suitable type of data. The instructions may comprise any suitable type or number of commands for processing the data. The user device 106 is further configured to receive feedback based on detection results from the system 110. For example, the feedback may indicate whether the image file 102 comprises a hidden executable file.

Operational Flow for Detecting Hidden Executable Files

A user may receive an image file 102 on their user device 106. The image file 102 may or may not comprise an embedded/hidden executable file 104. Therefore, additional measures may be conducted by system 110 to protect users from inadvertently executing the hidden executable file.

System 110 firstly conducts hash comparison 120. During this operation, system 110 generates a hash 122 of the received image 102. In an embodiment, system 110 uses a hashing algorithm (e.g., xxhash64) to generate a unique cryptographic hash value for the image file 102. The hashing algorithm can produce a hash value quickly so that hash comparison 120 can be completed efficiently. System 110 then fetches the stored hash values 116 of images without hidden executable files from the memory 114 by communicating with the memory 114 and querying out to fetch the stored hash values 116. Then system 110 compare the retrieved hash values 116 with the hash value 122 using a hash comparison model 124. The hash comparison model 124 determines a pattern for the hash 122 of the received image 102 and also patterns for the stored hash values 116. The hash comparison model 124 further compares the patterns. If the pattern of the hash value 122 of the image file 102 does not match any pattern of patterns of the stored hash values 116, it suggests that the image file 102 may comprise a hidden executable file 104.

If the pattern of the hash value 122 of the image file matches at least one pattern of patterns of the stored hash values 116, it suggests that the image file 102 may not comprise a hidden executable file 104. System 110 further conducts an AI based image analysis 130 as a secondary security measure. In an embodiment, the AI based image analysis utilizes an AI algorithm/model, such as convolutional neural networks (CNNs), to further examine the image file 102 for signs of a hidden executable file 104. As an example, and not by way of limitation, the CNNs can be based on a ResNet architecture, which can effectively capture intricate features and patterns that may be indicative of a hidden executable file.

In an embodiment, the AI algorithm/model used in the AI based image analysis is trained as follows. To begin with, system 110 conducts dataset preparation by collecting a training dataset of images and executable files. System 110 then trains the algorithm/model using the training dataset. During training, the algorithm/model learns to classify between images and executable files based on the features extracted from the input data.

Based on the results from hash comparison 120 and AI based image analysis 130, system 110 further conducts content filtering 140. For content filtering 140, system 110 identifies and blocks access to files with certain extensions, formats, content, or associated with certain websites.

Besides blocking access to certain files, system 110 may execute one or more of the following actions upon detecting a hidden executable file. One action can be disabling the interaction with (e.g., click on) the image. Another action can be removing the hidden executable file from the image before access to the image is permitted. Another action can be isolating the image in a quarantine to prevent it from executing or spreading. The quarantined image can be further tested and made secure. Another action can be alerting a user about the detection. Another action can be initiating a full system scan to check for any additional hidden executable file that may have been introduced alongside the detected hidden executable file. Another action may be deleting the image. Another action may be logging the detection of the hidden executable file for future reference. Another action may be updating security rules based on the detected hidden executable file. Another action may be reporting to a centralized database for further analysis to improve the detection capabilities for hidden executable files.

Example Method for Detecting Hidden Executable Files

FIGS. 2A-2B illustrate an example flowchart of a method 200 for detecting hidden executable files. Modifications, additions, or omissions may be made to method 200. Method 200 may include more, fewer, or other operations. For example, operations may be performed in parallel or in any suitable order. While at times discussed as system 110, processor 112, user device 106 or components of any of thereof performing operations, any suitable system or components of the system may perform one or more operations of the method 200. For example, one or more operations of method 200 may be implemented, at least in part, in the form of software instructions (e.g., software instructions 118 of FIG. 1), stored on non-transitory, tangible, machine-readable media (e.g., memory 114 of FIG. 1) that when run by one or more processors (e.g., processor 112 of FIG. 1) may cause the one or more processors to perform operations 202-232.

Now referring to FIG. 2A, after start, the processor 112 accesses a first image at operation 202. As an example, and not by way of limitation, the user device 106 may be executing an application and then receive an image via the application. The processor 112 may then access the received image.

At operation 204, the processor 112 converts the first image to binary data.

At operation 206, the processor 112 inputs the binary data into a hashing algorithm to generate a first hash value for the first image. In an embodiment, the hashing algorithm can take the file path of the first image as input and read the content of the first image in binary mode. The hashing algorithm then calculates the hash value of the content. As an example and not by way of limitation, the hashing algorithm may be xxhash64, which returns a hexadecimal representation of the hash value.

At operation 208, the processor 112 determines, based on a machine-learning model, a first pattern associated with the first hash value and patterns associated with stored hash values corresponding to images without hidden executable files, respectively. In particular embodiments, the stored hash values may be stored in memory 114 illustrated in FIG. 1.

At operation 210, the processor 112 compares the first pattern and each of the patterns associated with stored hash values by the machine-learning model. Comparing the patterns of the hash values instead of directly comparing the hash values may be because the hash value of the first image may not exactly match a hash value of the stored hash values since the images corresponding to the stored hash values may not include an image that is exactly the same as the first image. However, the pattern of the first hash value may match some patterns of the stored hash values when they are of the same type of images. As an example, and not by way of limitation, the hash value of every JPEG image may start with '0xFFD8' and end with '0xFFD9' but the middle of the hash values may vary. This is the pattern the machine-learning model determines and compares. If the first image is also a JPEG image, the pattern of its hash value would match the pattern(s) of stored hash value(s) corresponding to JPEG image(s).

At operation 212, the processor 112 determines whether the first pattern match any of the patterns associated with the stored hash values. If the first pattern does not match any of the patterns associated with the stored hash values, the processor 112 determines the first image comprises a hidden executable file at operation 214.

At operation 216, the processor 112 disables interaction with the first image. As an example and not by way of limitation, a user may not be able to click on the first image on the user device 106.

At operation 218, the processor 112 determines that the first image is associated with one or more of a particular extension, a particular format, a particular content, or a particular website.

At operation 220, the processor 112 further blocks access to images associated with one or more of the particular extension, the particular format, the particular content, or the particular website. Method 200 then ends.

If the first pattern matches any of the patterns associated with the stored hash values, method 200 proceeds to operation 222.

Now referring to FIG. 2B, at operation 222, the processor 112 inputs features of the first image into an artificial-intelligence algorithm configured to classify between images and executable files.

At operation 224, the processor 112 determines, based on the artificial-intelligence algorithm, whether the first image comprises a hidden executable file.

At decision point 226, if the first image is determined to comprise a hidden executable file, method 200 proceeds to operation 228, where the processor 112 disables interaction with the first image.

At operation 230, the processor 112 determines that the first image is associated with one or more of a particular extension, a particular format, a particular content, or a particular website. At operation 232, the processor 112 further blocks access to images associated with one or more of the particular extension, the particular format, the particular content, or the particular website. Method 200 then ends.

At decision point 226, if the first image is determined to not comprise a hidden executable file, method 200 proceeds to operation 234, where the processor 112 enables interaction with the first image. As an example, and not by way of limitation, a user may click on the first image. Method 200 then ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

The invention claimed is:

1. A system for detecting hidden executable files, comprising:
   a memory operable to store a plurality of hash values corresponding to a plurality of images without hidden executable files, respectively; and
   a processor, operably coupled to the memory, and configured to:
   access a first image;
   generate a first hash value for the first image based at least in part upon a hashing algorithm;
   determine a first pattern associated with the first hash value and a plurality of patterns associated with the plurality of stored hash values, respectively;
   determine whether the first pattern matches any of the plurality of patterns based at least in part upon a comparison between the first pattern and each of the plurality of patterns;
   determine the first image comprises a hidden executable file if the first pattern does not match any of the plurality of patterns; and
   if the first pattern matches one of the plurality of patterns:

extract features from the first image;

input the extracted features into an artificial-intelligence algorithm configured to classify between images and executable files; and determine, based on the artificial-intelligence algorithm, whether the first image comprises a hidden executable file.

2. The system of claim 1, wherein the first pattern does not match any of the plurality of patterns, and the processor is further configured to:

disable an interaction with the first image.

3. The system of claim 1, wherein the first pattern does not match any of the plurality of patterns, and the processor is further configured to:

determine the first image is associated with one or more of a particular extension, a particular format, a particular content, or a particular website; and block access to images associated with one or more of the particular extensions, the particular format, the particular content, or the particular website.

4. The system of claim 1, wherein the processor is further configured to:

determine a file path associated with the first image, wherein accessing the first image is via the determined file path.

5. The system of claim 1, wherein the processor is further configured to:

convert the first image to binary data; and input the binary data into the hashing algorithm.

6. The system of claim 1, wherein the memory is further operable to store a plurality of additional hash values corresponding to a plurality of executable files, respectively, and the processor is further configured to:

determine, based on a machine-learning model, a plurality of patterns associated with the plurality of additional hash values, respectively;

determine whether the first pattern matches any of the plurality of patterns associated with the additional hash values based at least in part upon a comparison between the first pattern and each of the plurality of patterns associated with the additional hash values by the machine-learning model;

determine the first image does not comprise a hidden executable file if the first pattern does not match any of the plurality of patterns associated with the additional hash values; and determine the first image comprises a hidden executable file if the first pattern matches any of the plurality of patterns associated with the additional hash values.

7. The system of claim 1, wherein determining the first pattern and the plurality of patterns, and determining whether the first pattern matches any of the plurality of patterns are based on a machine-learning model.

8. The system of claim 1, wherein the processor is further configured to:

determine the first image does not comprise a hidden executable file if the first pattern matches one of the plurality of patterns.

9. The system of claim 1, wherein the first pattern does not match any of the plurality of patterns, wherein the processor is further configured to:

execute one or more actions comprising one or more of:

removing the hidden executable file from the first image before access to the first image is permitted;

isolating the first image in a quarantine;

initiating a complete system scan configured to check for any additional hidden executable file associated with the detected hidden executable file;

deleting the first image;

recording the detection of the hidden executable file in a system log;

updating one or more security rules based on the detected hidden executable file; or reporting the detected hidden executable file to a centralized database for further analysis.

10. A method for detecting hidden executable files comprising, by one or more computing systems:

accessing a first image;

generating a first hash value for the first image based at least in part upon a hashing algorithm;

determining a first pattern associated with the first hash value and a plurality of patterns associated with a plurality of stored hash values corresponding to a plurality of images without hidden executable files, respectively;

determining whether the first pattern matches any of the plurality of patterns based at least in part upon a comparison between the first pattern and each of the plurality of patterns;

determining the first image comprises a hidden executable file if the first pattern does not match any of the plurality of patterns; and if the first pattern matches one of the plurality of patterns:

extracting features from the first image;

inputting the extracted features into an artificial-intelligence algorithm configured to classify between images and executable files; and determining, based on the artificial-intelligence algorithm, whether the first image comprises a hidden executable file.

11. The method of claim 10, wherein the first pattern does not match any of the plurality of patterns, and the method further comprising:

disabling an interaction with the first image.

12. The method of claim 10, wherein the first pattern does not match any of the plurality of patterns, and the method further comprising:

determining the first image is associated with one or more of a particular extension, a particular format, a particular content, or a particular website; and blocking access to images associated with one or more of the particular extensions, the particular format, the particular content, or the particular website.

13. The method of claim 10, further comprising:

determining the first image does not comprise a hidden executable file if the first pattern matches one of the plurality of patterns.

14. The method of claim 10, further comprising:

determining, based on a machine-learning model, a plurality of patterns associated with a plurality of additional hash values, respectively, wherein the plurality of additional hash values correspond to a plurality of respective executable files;

determining whether the first pattern matches any of the plurality of patterns associated with the additional hash values based at least in part upon a comparison between the first pattern and each of the plurality of patterns associated with the additional hash values by the machine-learning model;

determining the first image does not comprise a hidden executable file if the first pattern does not match any of the plurality of patterns associated with the additional hash values; and determining the first image comprises a hidden executable file if the first pattern matches any of the plurality of patterns associated with the additional hash values.

15. A non-transitory computer-readable medium storing instructions that when executed by a processor cause the processor to:

access a first image;

generate a first hash value for the first image based at least in part upon a hashing algorithm;

determine a first pattern associated with the first hash value and a plurality of patterns associated with a plurality of stored hash values corresponding to a plurality of images without hidden executable files, respectively;

determine whether the first pattern matches any of the plurality of patterns based at least in part upon a comparison between the first pattern and each of the plurality of patterns;

determine the first image comprises a hidden executable file if the first pattern does not match any of the plurality of patterns; and if the first pattern matches one of the plurality of patterns:

extract features from the first image;

input the extracted features into an artificial-intelligence algorithm configured to classify between images and executable files; and determine, based on the artificial-intelligence algorithm, whether the first image comprises a hidden executable file.

16. The non-transitory computer-readable medium of claim 15, wherein the first pattern does not match any of the plurality of patterns, and the instructions further cause the processor to:

disable an interaction with the first image.

17. The non-transitory computer-readable medium of claim 15, wherein the first pattern does not match any of the plurality of patterns, and the instructions further cause the processor to:

determine the first image is associated with one or more of a particular extension, a particular format, a particular content, or a particular website; and block access to images associated with one or more of the particular extension, the particular format, the particular content, or the particular website.

\* \* \* \* \*